United States Patent
Arrieta et al.

(10) Patent No.: US 7,758,432 B2
(45) Date of Patent: Jul. 20, 2010

(54) EXTERIOR JOINT PART COMPRISING A SUPPORTING DISC

(75) Inventors: Nestor Rekalde Arrieta, Gipuzkoa (ES); Joseba Romatet, Zumaia (ES); Julian Arrillaga, San Sebastian (ES)

(73) Assignee: GKN Driveline International GmbH, Lohmar (DE)

( * ) Notice: Subject to any disclaimer, the term of this patent is extended or adjusted under 35 U.S.C. 154(b) by 106 days.

(21) Appl. No.: 10/562,430

(22) PCT Filed: Oct. 2, 2004

(86) PCT No.: PCT/EP2004/011010
§ 371 (c)(1),
(2), (4) Date: Dec. 27, 2005

(87) PCT Pub. No.: WO2005/050044
PCT Pub. Date: Jun. 2, 2005

(65) Prior Publication Data
US 2006/0223643 A1 Oct. 5, 2006

(30) Foreign Application Priority Data
Oct. 24, 2003 (EP) .................................. 03024355

(51) Int. Cl.
*F16D 3/224* (2006.01)
(52) U.S. Cl. ........................ 464/178; 464/906
(58) Field of Classification Search .................. 464/178, 464/906; 403/164, 165; 384/544, 589; 301/105.1
See application file for complete search history.

(56) References Cited

U.S. PATENT DOCUMENTS

| 2,713,504 | A | * | 7/1955 | Padbury ................. 464/178 X |
| 4,010,986 | A | * | 3/1977 | Otto |
| 5,674,011 | A | * | 10/1997 | Hofmann et al. ........ 464/178 X |
| 5,833,243 | A | * | 11/1998 | Booker et al. |
| 6,135,571 | A | * | 10/2000 | Mizukoshi et al. ....... 301/105.1 |
| 2002/0049091 | A1 | | 4/2002 | Ogura et al. |
| 2002/0110299 | A1 | * | 8/2002 | Schote ........................ 384/544 |
| 2004/0022471 | A1 | * | 2/2004 | Yamamoto ................. 384/544 |

FOREIGN PATENT DOCUMENTS

| EP | 1 125 765 A2 | 8/2001 |
| JP | 2002 002210 | 8/2002 |

* cited by examiner

*Primary Examiner*—Greg Binda
(74) *Attorney, Agent, or Firm*—Rader, Fishman & Grauer PLLC

(57) ABSTRACT

An outer joint part (12) of a constant velocity universal joint (11) in the form of a joint bell (16) with an attached connecting journal (17) and a radial supporting face (18) at the joint bell (16). The outer joint part (12), by threading, can be tensioned relative to a wheel hub (25) slid on to the connecting journal and which is supported either directly or indirectly on the supporting face (18). An annular disc (22) which is made of a low-friction material and is positioned on the supporting face (18) so as to be concentric relative to the connecting journal (17).

12 Claims, 3 Drawing Sheets

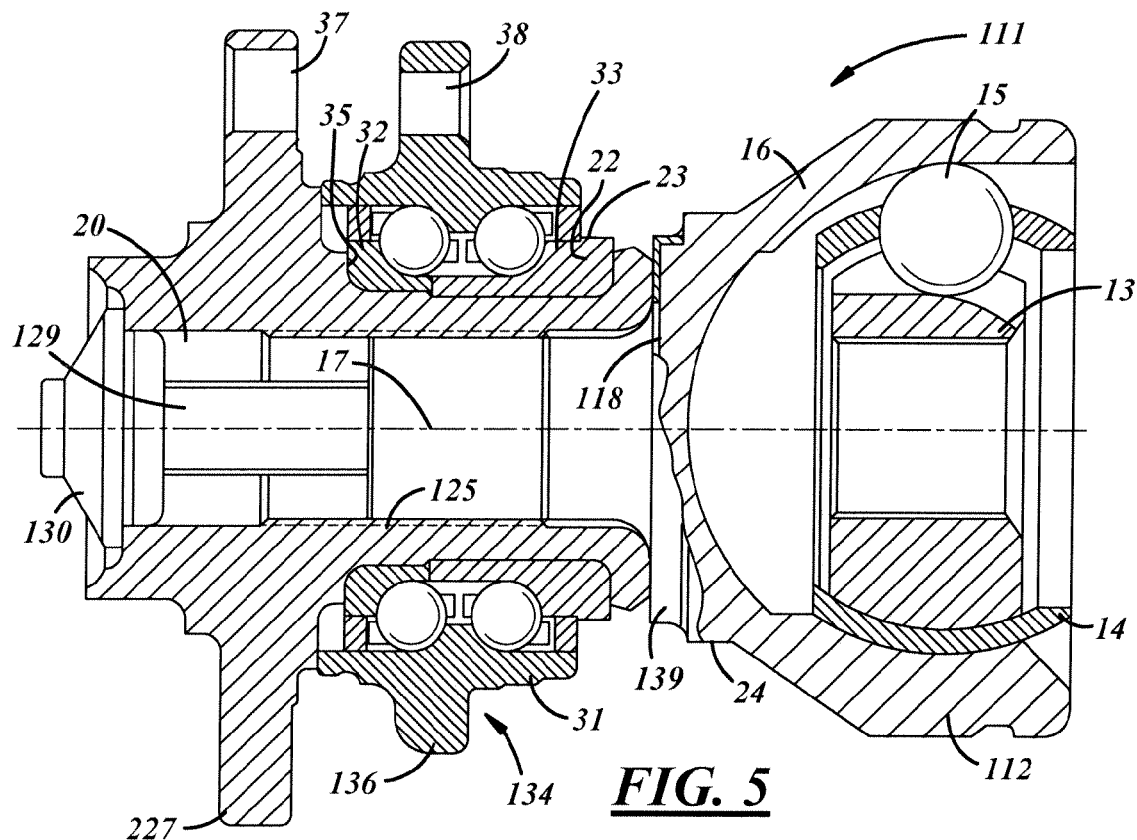
FIG. 5
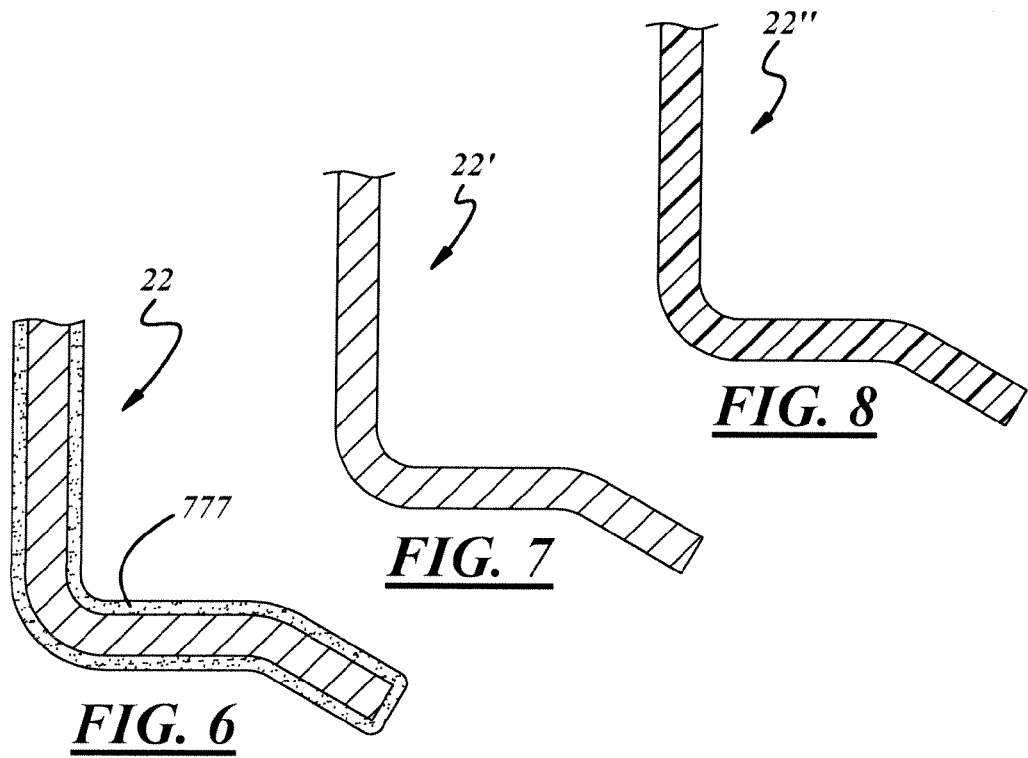
FIG. 6
FIG. 7
FIG. 8

EXTERIOR JOINT PART COMPRISING A SUPPORTING DISC

BACKGROUND

The invention relates to an outer joint part of a constant velocity universal joint in the form of a joint bell with an attached connecting journal and a radial supporting face at the joint bell at the base of the connecting journal, wherein the outer joint part, by means of threading means, can be clamped to a wheel hub which has to be slid on to the connecting journal and which is supported either directly or indirectly on the supporting face.

Furthermore, the invention relates to an assembly consisting of a constant velocity universal joint with an outer joint part in the form of a joint bell with an attached connecting journal and a radial supporting face at the joint bell at the base of the connecting journal, as well as of a wheel hub which is slid on to the connecting journal and which, via threading means, is clamped to the outer joint part, wherein the wheel hub is directly or indirectly supported on the supporting face.

Assemblies of this type are used in the region of wheel bearings of driven motor vehicle wheels. The constant velocity universal joint forms the joint at the wheel end of driveshafts or sideshafts of motor vehicles. When mounting the shafts to the hub assembly, there takes place an axial clamping operation between the wheel hub and the outer joint part via threading means, wherein mutual support is effected either via the inner bearing races of a wheel bearing attached to the wheel hub or via the wheel hub itself, in each case relative to a supporting face at the outer joint part. When the vehicle is in use, in spite of high clamping forces, the occurrence of micro movements at the supporting face of the outer joint part is possible which generate a great deal of noise. Said micro movements are the result of a non-uniform introduction of force and possibly also of rotating bending moments. Even if the surfaces contacting one another are very carefully machined, it has so far not been possible to avoid said noise development.

SUMMARY OF THE INVENTION

It is therefore an object of the present invention to solve said problem by suppressing the development of noise. The solution provides an outer joint part of said type which is characterized by an annular disc which is made of a low-friction material and which is positioned on the supporting face so as to be concentric relative to the connecting journal. More particularly, the annular disc can comprise a cylindrical portion which starts from the outer edge of same and is positioned on a suitable cylindrical portion at the joint bell in a force-locking way, i.e. under a radial pretension.

Accordingly an assembly a constant velocity universal joint and a wheel hub of said type is thus characterized in that there is provided an annular disc which is made of a low-friction material, which is positioned directly on the supporting face so as to be concentric relative to the connecting journal and which accommodates the clamping forces of the threads. According to a first embodiment, on to the wheel hub there are slipped bearings which are axially pretensioned by threads and whose inner bearing races are axially supported on the wheel hub on the one hand and on the annular disc on the other hand under the load of the threads. Alternatively, bearings are slipped on to the wheel hub, with the inner bearing races of said bearings being clamped to the wheel hub by an annular bead at the wheel hub, with the annular bead being directly supported on the annular disc under the load of the threading mechanism. The annular bead is produced by plastically deforming the wheel hub after the bearings have been slipped on. The low-friction annular disc is selected in such a way that the micro movements which are now divided up between the annular disc and the outer joint part on the one hand and the annular disc and the inner bearing race or beading on the other hand can no longer lead to any noise.

BRIEF DESCRIPTION OF THE DRAWINGS

Preferred embodiments of the invention are illustrated in the drawings which will be described below and wherein

FIG. 5 is a longitudinal section through a modified embodiment of an inventive assembly similar to that shown in FIG. 3.

FIG. 6 is a detailed illustration of an annular disc in accordance with the present invention, the annular disc illustrated as a non-ferrous metal.

FIG. 7 is a detailed illustration of an annular disc in accordance with the present invention, the annular disc illustrated as an anti-friction coating.

FIG. 8 is a detailed illustration of an annular disc in accordance with the present invention, the annular disc illustrated as a plastic material.

DETAILED DESCRIPTION OF THE DRAWINGS

Figure 1:
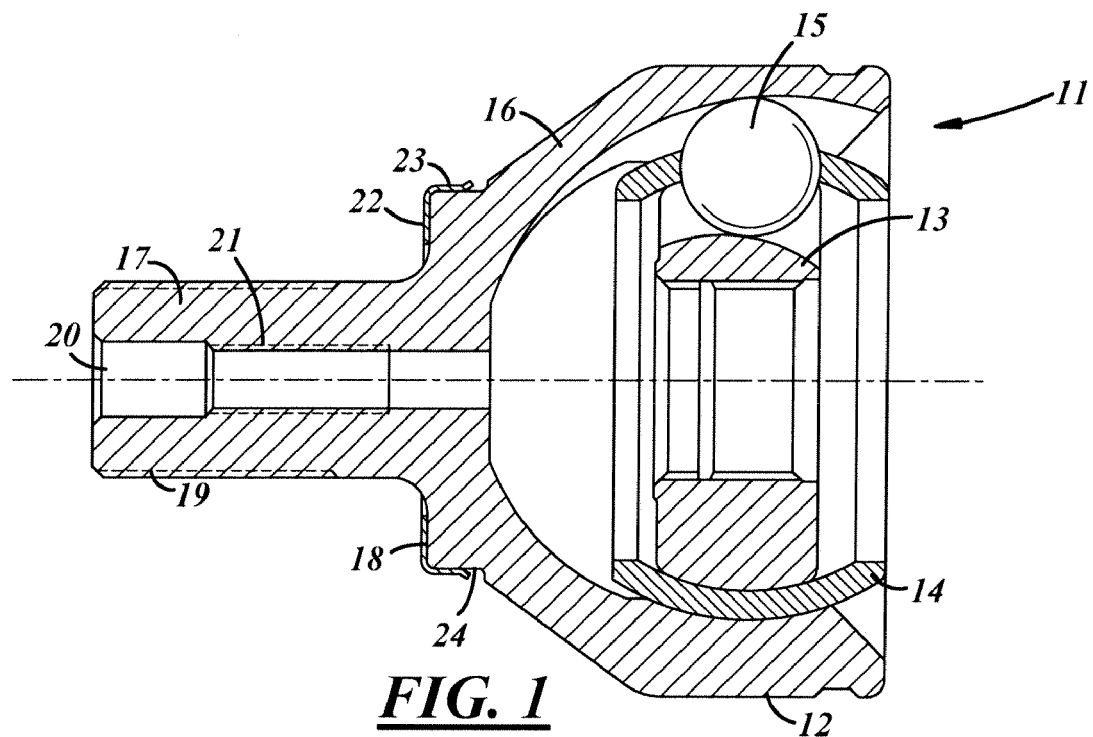
FIG. 1 is a longitudinal section through a constant velocity universal joint having an inventive outer joint part with a supporting disc.

FIG. 1 shows a constant velocity universal joint 11 which comprises an inventive outer joint part 12, an inner joint part 13, a cage 14 as well as one of a plurality of torque transmitting balls 15. The inventive outer joint part 12 comprises a joint bell 16, a connecting journal 17 attached thereto as well as a radial supporting face 18 arranged concentrically relative to said connecting journal 17. On the outside of the connecting journal 17 there is provided shaft teeth 19 (splines) to provide a torque transmitting engagement with a wheel hub 25 (FIG. 2) as well as an inner bore 20 with an inner thread 21 for threading in a tensioning screw. On to the radial supporting face 18, there is placed a supporting disc 22 which, at its outer circumference, changes into a cylindrical portion 23 which is held in a form-fitting and positive way on a cylindrical step 24 of the outer joint part 12.

Figure 2:
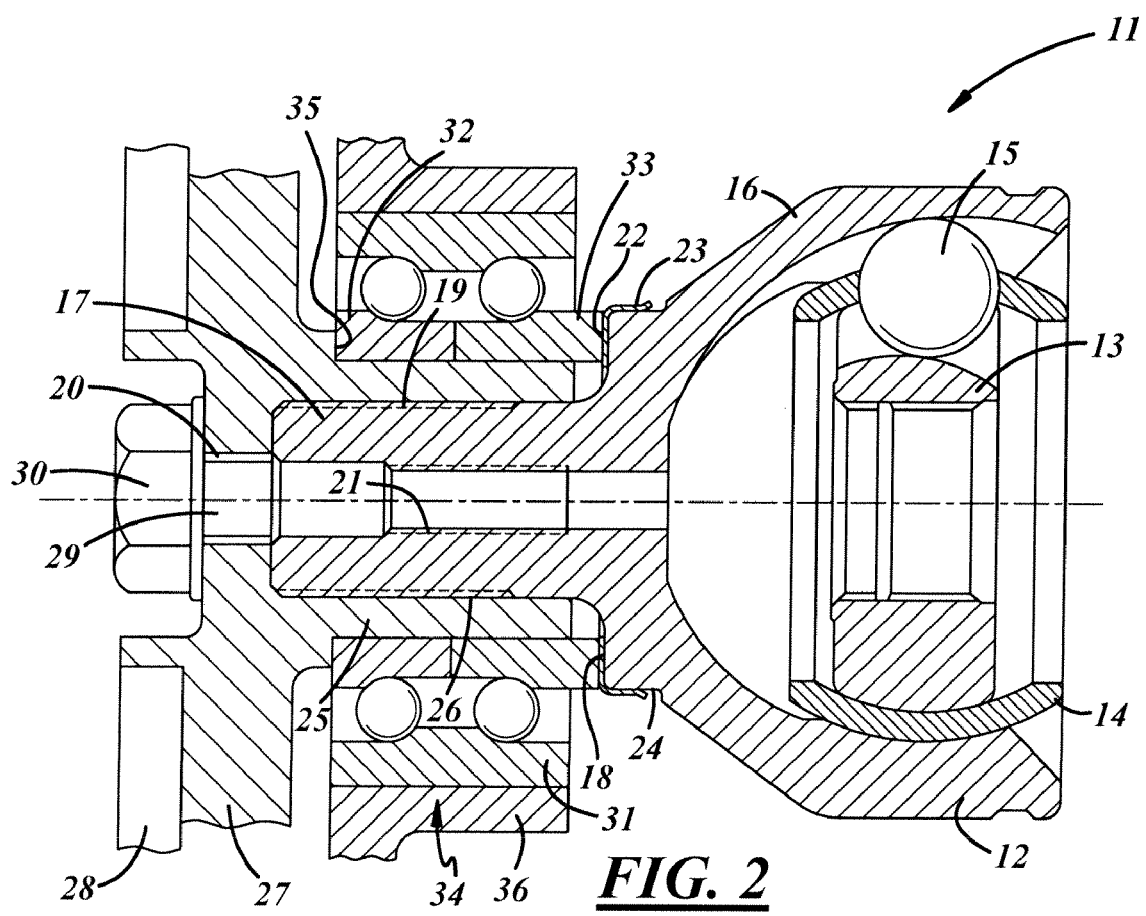
FIG. 2 is a longitudinal section through a first embodiment of an inventive assembly of a constant velocity universal joint and a wheel hub.

In FIG. 2, any details identical to those shown in FIG. 1 have been given the same reference numbers. A wheel hub 25 which, by of counter teeth 26 (splines), form-fittingly and positively engages the shaft teeth 19 has been slipped on to the connecting journal 17. The wheel hub 25 is followed by a wheel flange 27 which is connected to a brake disc 28 in a way not shown in greater detail. Via a tensioning bolt 29 whose bolt head 30 is supported on the wheel flange 27 and which is threaded into the inner thread 21 of the through-aperture 20, the wheel hub 25 is clamped to the outer joint part 12. On to the wheel hub 25, there is slipped a double-row wheel bearing 34 whose inner bearing races 32, 33 are axially supported on the one hand on a supporting face or step 35 of the wheel flange 27 and, on the other hand, on the supporting disc 22 under the pretensioning force of the bolt 29. The outer bearing race 31 of the wheel bearing 34 has been inserted into a wheel carrier 36. In the type of wheel bearing selected, the pretension of the bearing is set by the tensioning bolt 29.

Figure 3:
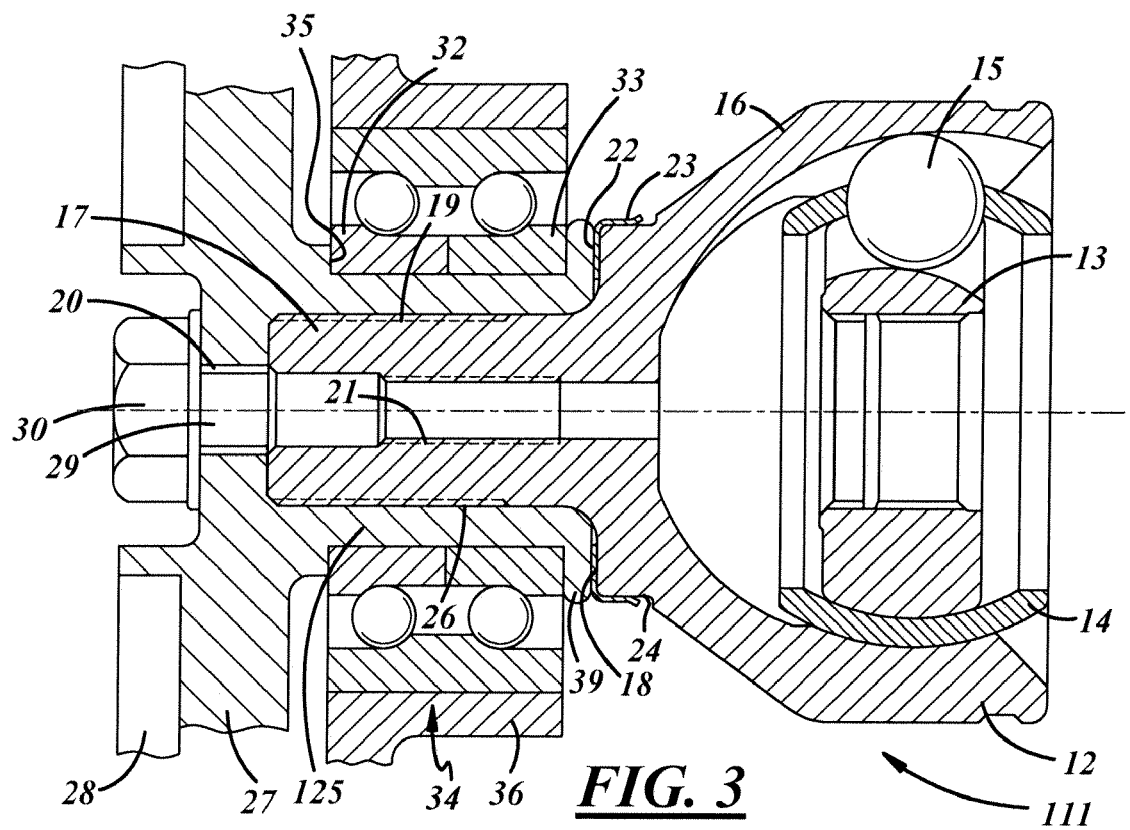
FIG. 3 is a longitudinal section through a second embodiment of an inventive assembly of a constant velocity universal joint and a wheel hub.

In FIG. 3, any details identical to those shown in FIG. 1 have been given the same reference numbers. A wheel hub 125 which, by inner splines 26, form-fittingly and positively engages the shaft splines 19 has been slipped on to the connecting journal 17. The wheel hub 125 is followed by a wheel flange 27 which is connected to a brake disc 28 in a way not shown in greater detail. Via a tensioning bolt 29 whose bolt head 30 is supported on the wheel flange 27 and which is threaded into the inner thread 21 of the through-aperture 20, the wheel hub is clamped to the outer joint part 12. On to the wheel hub 17 there is slipped a wheel bearing 34 whose inner bearing races 32, 33 are supported on a supporting face or step 35 of the wheel flange 27 and axially tensioned and fixed by a beading 39 of the wheel hub 125. By an annular face, said beading 39 rests against the annular disc 22 under the pretensioning force of the bolt 29. In this case, too, the outer bearing race 31 of the wheel bearing 34 is inserted into a wheel carrier 36. The pretension of the bearing is determined by the production steps and the shape of the beading 39.

Figure 4:
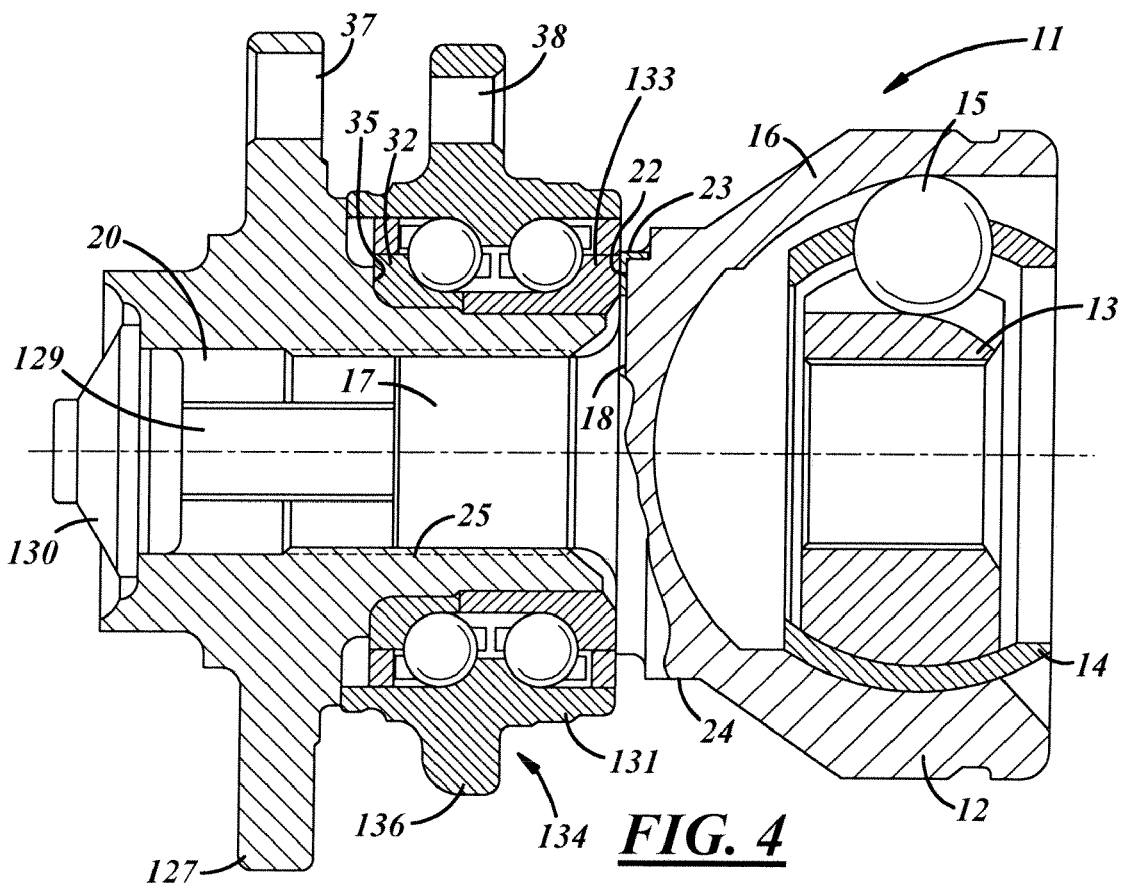
FIG. 4 is a longitudinal section through a modified embodiment of an inventive assembly similar to that shown in FIG. 2.

In FIG. 4, any details which are identical to those shown in FIG. 2 have been given the same reference numbers. To that extent, reference is made to the description of FIG. 2. The parts illustrated which have slightly different geometries are indexed by multiples of 100. The bolt head 130 of the bolt 129, for example, clearly deviates from that of the previous figures. The brake disc is not shown. The wheel bearing 134 is shown in its entirety, including seals and bearing cages. The outer bearing race 131 is integral with the wheel carrier 136. The wheel flange 127 and the wheel carrier 136 are shown to have flange holes 37, 38. The supporting disc 22 prevents direct contact between the inner bearing race 133 and the supporting face 118 of the outer joint part 112, so that, under load, relative micro movements are accommodated by the supporting disc in a noise-free way.

In FIG. 5, any details which are identical to those shown in FIG. 4 have been given the same reference numbers. To that extent, reference is made to the description of FIGS. 2 and 4. Again, the parts illustrated which have slightly different geometries, such as the bolt head 130 of the bolt 129, are indexed by multiples of 100. The brake disc is not shown. The wheel bearing 134 is shown in its entirety, including seals and bearing cages. The outer bearing race is integral with the wheel carrier 136. The wheel flange 227 and the wheel carrier 136 are shown to have flange holes 37, 38. The supporting disc 22 prevents direct contact between the beading 139 and the supporting face 118 of the outer joint part 112, so that, under load, relative micro movements are accommodated by the supporting disc in a noise free way.

According to one embodiment, the annular disc 22 is an iron material and comprises a coating of Molykote D321 R or equivalent anti friction lubricant coating 777. Before the coating is applied, the annular disc can be phosphated or sandblasted. In a further aspect, the annular disc is bronze or non-ferrous metal 22'. Finally, according to a further embodiment it is possible for the annular disc to be any suitable, high-resistance, optionally fiber-reinforced plastic 22".

What is claimed is:

1. A constant velocity universal joint assembly comprising:
   a constant velocity universal joint with an outer joint part in the form of a joint bell with an attached connecting journal and a radial supporting face at the joint bell at the base of the connecting journal;
   a wheel hub which is slid on to the connecting journal and which, via threading, is clamped to the outer joint part, wherein the wheel hub is directly or indirectly supported on the supporting face;
   an annular disc made of a low-friction material, which is positioned directly on the supporting face so as to be concentric relative to the connecting journal and which accommodates the clamping forces of the threading; and
   bearings positioned on the wheel hub, wherein an inner bearing race of said bearings is directly axially supported on the annular disc.

2. A constant velocity universal joint assembly according to claim 1, wherein the annular disc comprises a cylindrical portion which starts from an outer edge of the annular disc and is positioned on the joint bell in a force-locking way.

3. A constant velocity universal joint assembly according to claim 1, wherein the annular disc comprises an anti-friction coating.

4. A constant velocity universal joint assembly according to claim 1, wherein the annular disc comprises bronze or non-ferrous metal.

5. A constant velocity universal joint assembly according to claim 4, wherein the annular disc comprises bronze.

6. A constant velocity universal joint assembly according to claim 1, wherein the annular disc comprises plastics.

7. A constant velocity universal joint assembly comprising:
   a constant velocity universal joint with an outer joint part in the form of a joint bell with an attached connecting journal and a radial supporting face at the joint bell at the base of the connecting journal;
   a wheel hub which is slid on to the connecting journal and which, via threading, is clamped to the outer joint part, wherein the wheel hub is directly or indirectly supported on the supporting face;
   an annular disc made of a low-friction material, which is positioned directly on the supporting face so as to be concentric relative to the connecting journal and which accommodates the clamping forces of the threading; and
   bearings positioned on the wheel hub and whose inner bearing races are axially clamped to the wheel hub by annular beading at the wheel hub, wherein the annular beading is directly axially supported at the annular disc.

8. A constant velocity universal joint assembly according to claim 7, wherein the annular disc comprises a cylindrical portion which starts from an outer edge of the annular disc and is positioned on the joint bell in a force-locking way.

9. A constant velocity universal joint assembly according to claim 7, wherein the annular disc comprises an anti-friction coating.

10. A constant velocity universal joint assembly according to claim 7, wherein the annular disc comprises bronze or non-ferrous metal.

11. A constant velocity universal joint assembly according to claim 10, wherein the annular disc comprises bronze.

12. A constant velocity universal joint assembly according to claim 7, wherein the annular disc comprises plastics.

* * * * *

UNITED STATES PATENT AND TRADEMARK OFFICE
CERTIFICATE OF CORRECTION

PATENT NO. : 7,758,432 B2  
APPLICATION NO. : 10/562430  
DATED : July 20, 2010  
INVENTOR(S) : Nestor R. Arrieta et al.

Page 1 of 1

It is certified that error appears in the above-identified patent and that said Letters Patent is hereby corrected as shown below:

Column 4, claim 4, line 26, delete "bronze or"  
Column 4, claim 10, line 57, delete "bronze or"

Signed and Sealed this  
Fourth Day of December, 2012

David J. Kappos  
*Director of the United States Patent and Trademark Office*